Jan. 7, 1964 R. W. BURDEN ETAL 3,117,186

COMPATIBLE STEREOPHONIC BROADCAST SYSTEM

Filed Feb. 17, 1960 2 Sheets-Sheet 1

CANCELLATION OF L-R AND R-L BY ELECTRICAL MATRIX

WILLIAM S. HALSTEAD
RICHARD W. BURDEN
INVENTORS

BY Theodore Keefe
ATTORNEY

RICHARD W. BURDEN
WILLIAM S. HALSTEAD
INVENTORS
BY [signature]
ATTORNEY 3,117,186
COMPATIBLE STEREOPHONIC BROADCAST SYSTEM Richard W. Burden, 34 W. Hyatt Ave., Mount Kisco, and William S. Halstead, 76 Washington Place, New York, N.Y.

Filed Feb. 17, 1960, Ser. No. 9,355
9 Claims. (Cl. 179—15)

This invention relates to stereophonic broadcasting and, more specifically, to stereophonic broadcast transmission and reception by means of FM multicast method and/or FM–AM simulcast method. The invention may also be applied to other forms of stereophonic transmission, such as AM–FM–TV stereo systems, and/or stereo sound systems.

A number of commercial broadcast stations in the United States are now providing regularly-scheduled stereophonic programs for their listeners, using associated FM and AM transmitters are separated "left" and "right" stereo transmission channels.

Other FM stations have provided stereophonic program transmission by use of an FM transmitter and a multiplex subchannel to provide the two stereo transmission channels, L and R.

In order to accommodate the monophonic listener to stereophonic broadcasts under conditions in which only one stereo transmission channel is received, as in the case of an individual listening to the main channel, only, of an FM station, various proposals have been advanced for reproducing the audio signals of both stereo channels at the monophonic receiving point, thus providing what has been termed "compatible" reception in terms of the subjective response of the monophonic listener.

These proposals have incorporated the use of matrix arrangements for combining signals in the two stereo transmission channels at the FM broadcast station, and thereafter separating the combined signals at the stereo receiving point into the separate L and R stereo channels. Among these arrangements has been the proposed "sum-and-difference" matrixing techniques which combine the audio signals in the two stereo channels, L and R, by matrix summing method, as $L+R$ on one radio transmission channel, such as the main program channel of an FM broadcast station; the difference signals, $L-R$, as provided by the matrix arrangement, are transmitted by a second radio channel, such as a subchannel in an FM multiplex system. Thus, monophonic listeners to the main channel only of an FM station will hear all of the musical instruments or other sounds transmitted on the combined L and R channels of a stereo broadcast station employing this technique. In order to derive the original L and R stereo channels at stereo radio-receiving points, a corrective dematrixing network, and accurate preservation of phase and amplitude relationships, are required in both channels of the system. As special dematrixing networks are necessary at receiving points in order to separate the L and R stereo channels, the "sum-and-difference" methods are not compatible, in an operational sense, with FM–AM stereo broadcast techniques now in wide public service.

Other proposed matrix circuits for stereophonic broadcasting combine the audio signals of two stereo channels, L and R, by matrix summing technique as $L+R$ on one radio transmission channel, such as the main FM broadcast channel; the second radio transmission channel carries an original unmixed R signal in the right stereo channel, such as the subchannel of an FM multiplex system. In this arrangement, the signals in the right stereo channel bear a phase relationship of —R to the sum signals $L+R$ in the left, or main channel. As in the first-mentioned matrix system, a corrective dematrixing network is required at receiving points. Accurate preservation of phase and amplitude relationships are also required. As the combined L and R signals are transmitted on the main channel, and as a dematrix network is necessary at receiving points in order to derive the separate L and R stereo channels, this matrixing method also is not compatible with FM–AM stereocast techniques now in use.

Inasmuch as the FM–AM stereo broadcast method utilizes receivers already in the hands of the public, and reaches a large audience equipped with both FM and AM receivers, substantial revenue is derived by the stations from commercial sponsorship of the stereophonic programs because they are widely heard, both by the larger AM audience and the smaller, but important, FM audience. Therefore, it is important, from an economic viewpoint, to provide a stereo broadcast system which will permit FM–AM stations already serving the public with stereophonic programs to retain their present income-producing transmission method when they wish to introduce stertophonic program transmission by the new and improved FM multiplex method.

By providing a system which is compatible, in an operational sense, with respect to these two stereo transmission methods, the FM stations will be able to gradually build a new, but slowly developing, audience for the improved stereophonic broadcasts made possible by the use of FM multiplex techniques. Inasmuch as the stereo matrixing methods as outlined above require special dematrix networks at receiving points in order to provide separation of the L and R channels for stereophonic reproduction of programs, the use of these methods would present serious economic problems to the broadcast stations.

As in the case of the development of color television, a similar problem initially was presented in that it was necessary to devise a new system which could be introduced and used simultaneously in association with an older system without impairing the basic operation of either system. By adoption of a standard color system which is compatible in the true operational sense of the word, the performance of the black-and-white TV system, already in wide use by the public, was not impaired by the addition of color-transmission methods by the TV stations which then permitted them to simultaneously serve both the large audience equipped with black-and-white receivers and the new, but small and slowly-growing color TV audience, deriving the necessary revenue to sustain the entire TV service by sponsors who recognized that they were reaching both the large economically-important audience with black-and-white receivers, as well as the color TV audience.

The present invention provides a solution to the somewhat comparable problem presented by the requirement of the receiver matrixing methods for stereophonic reception which render the sysem incompatible with the FM–AM stereo transmission methods and, at the same time provides at the monophonic receiving point the signals of both transmitted stereo channels for the monophonic listener, so that when programs made with widely-separated microphones are used, the monophonic listener will still hear the signals in both channels, thus giving "compatibility" in a listener-reaction sense to the stereophonic broadcast system.

Inasmuch as no dematrixing network is required at rereceiving points in order to separate the two stereo channels, the stereophonic broadcast system of this invention can be used simultaneously with FM–AM stereocast techniques and the improved FM multiplex transmission and reception methods. It also can be used to improve monophonic reception of FM–AM stereocasts in which multiplex methods are not employed.

Another advantages of the present invention is that as the matrixing arrangement employed in the transmitter does not require a corrective dematrixing network in the receiver, the station may, at the option of the station, utilize fully-separated, or "pure," L and R stereo channels to provide optimum stereophonic separation effect with minimum distortion at stereo receiving points where well-balanced stereo program material is used. In the system of this invention, the transmission matrix may be switched in and out of the transmission circuit without introducing a problem at receiving points. In this connection, some stations prefer to use "pure" L and R stereo channels as the majority of the newer stereophonic recordings are made with mutiple groups of microphones to minimize the objectionable "hole-in-the-center" effect. Thus, most of the sounds recorded in each stereo channel of a tape or disk record, for example, are contained in both the L and R stereo channels and, therefore, provide the monophonic listener with a well-balanced reproduction of an orchestra, comparable to what the listener would hear if he were on the left-hand side of the center aisle of Carnegie Hall, for example, rather than at the exact center. Well-balanced stereo recordings of this type can readily be transmitted with completely separated, or "pure," L and R channels and received as such, for maximum stereo-separation and minimum of distortion due to absence of the mixing and unmixing process involved in matrix systems.

However, it is known that a relatively small number of novelty recordings contain highly localized, or separated, sounds recorded with widely separated microphones. In some cases, separation is such that it is almost the equivalent of having two separate rooms in which two singers are in different rooms. In this case, which is extreme, the system of the invention may be switched into the stereo transmission circuits and will raise the level of the "missing" singer, such as one whose voice may be recorded in the right channel, for example, to a power level within about −3 db of the companion singer's voice associated with the left-hand channel. Thus, the monophonic listener will hear both singers at approximately the same audio level, while the stereophonic listener will hear the singers as localized by the widely separated stereo signals in channels L and R.

The system of the invention also includes means for continuously providing an inaudible stereo "pilot" signal during stereo broadcasts which is transmitted on the two stereo transmission channels as a standard-reference balance signal, and which may be utilized at the receiving point to assist listeners in quickly and accurately adjusting their stereo receiving and amplifying equipment to provide a correct stereo balance, corresponding to the standard balance as established at the transmission station. Thus, proper stereo relationships may be maintained at all times at receiving points equipped with the system of the invention, any may be checked when desired.

The system of the invention also enables the inaudible pilot signal to be utilized in automatically silencing the multiplex subchannel audio output circuit at the conclusion of a stereo program transmission, when removal of the subcarrier at the station for any reason may introduce objectionable noise and other undesirable results due to lack of quieting of the multiplex receiver in absence of the subcarrier. Inasmuch as many FM stations plan to utilize the stereo subcarrier for special service transmissions to subscribers during the many hours when they are not broadcasting stereo programs, the automatic muting feature protects the station against unauthorized reception or "pirating" of these subscriber programs, as well as avoiding the objectionable noise that would otherwise be present at the audio output of the multiplex subcarrier adapter when the stereo subcarrier is removed at the station, as is accomplished normally during subscription radio transmissions between musical selections in order to silence subscriber receivers during these intervals.

The system of the invention also provides means for minimizing electrical impulse and other noise problems which occur at FM multiplex receiving points or at AM broadcast receiving points because of interference from local sources of noise, such as ignition systems of motor vehicles in the immediate vicinity, fluorescent lights, and many other electrical devices normally utilized in or near radio receiving points. In this connection, field experience has shown that FM multiplex circuits are much more susceptible to ignition noise, for example, than is the main-channel portion of the FM receiving equipment. Field experience also has demonstrated that if the audio-frequency response of the subchannel output circuit at the high audio frequencies, such as those above 7 or 8 kc., is restricted to cut off at a lower frequency, such as 6 kc., the audible effect of the ignition noise is very materially reduced, often to a value comparable to that obtained on the main channel. By further restricting the high-frequency response in the subchannel under abnormally-high ambient electric noise conditions, a substantially greater degree of improvement in signal-to-noise ratio can be obtained. However, this restriction in audio response in the multiplex subchannel, by itself and when employed for high-fidelity stereophonic reception, provides an audio unbalance in that the "left," or main FM channel will pass all the audio frequencies between 50 and 15,000 cycles, while the subchannel, in order to obtain good signal-to-noise performance, must be restricted to a much lower audio cut-off frequency, creating a noticeable difference in performance between the two channels which, for optimum results, should provide full high-fidelity audio-frequency response in both stereo channels.

As a solution to this problem, the system of the invention provides high-pass filter means connected with the main channel audio output of an FM receiver to pass the high audio frequencies, such as those between 8 and 15 kc., where little effective stereo localization effect is obtained, and mixes these high audio frequencies with the lower-frequency signals, from the multiplex receiver or AM broadcast receiver. As the lower audio frequencies, below 7 or 8 kc., provide most of the stereo effect and appear in the subchannel audio output, the overall result is to provide two full 15,000-cycle audio output channels, with unrestricted stereo separation at all of the lower and middle-range frequencies where practically all of the effective stereo separation effect occurs, and mixed-highs, which contribute relatively little localization, in both speaker circuits.

It is, therefore, a primary object of this invention to provide a compatible stereophonic broadcast system which is fully compatible, in an operational sense, as between FM–AM stereo systems, FM–AM–TV stereo systems, or FM multiplex stereo methods, and other stereo sound systems.

It is another object of the invention to provide a stereophonic broadcast system which is compatible in a subjective, or listener-reaction sense, in terms of the reaction of the monophonic listener who may be listening to a stereophonic broadcast with a conventional FM receiver, providing only the signals in the main FM channel.

It is an additional object of the invention to provide a system which may be adaptable to either FM–AM stereo broadcasting, FM–AM–TV stereocasts and other methods utilizing existing transmitting and receiving equipment, as well as FM multiplex stereo transmission methods.

It is still another object of the invention to provide a stereo matrixing arrangement for use at the broadcast station which provides partial mixing of the signals in both stereo channels and which, by acoustic matrixing at the stereo receiving point, permits the two channels, L and R, to be separated for effective stereophonic listening, without electrical matrix networks at stereo receiver points.

It is another object of the invention to provide a stereo matrix equipment at FM, AM and TV broadcast stations which may be switched in and out of the stereo transmission circuit without loss of stereophonic localization at stereo receiving points.

It is still another object of the invention to provide a matrix arrangement which will provide undistorted signals of both stereo channels at the monophonic receiving point within a power level of approximately 3 db with respect to each other, even under conditions of extreme separation of microphones at the stereo program source.

It is an additional object to provide a simple electrical matrix of resistive type for use at stereo receiving points to provide optimum separation of partially-mixed stereo signals as transmitted.

It is still another object of the invention to provide an inaudible stereo pilot signal which may be used as a standard transmitted stereo balance signal for reference purposes at stereo receiving points, thereby substantially assisting novice listeners in quickly and accurately establishing proper stereo balance at stereo receiving points.

It is still a further object of the invention to provide a stereo pilot signal which may also be utilized as an automatic, selective muting signal, to cause automatic silencing of the audio output of the multiplex subchannel adapter at the termination of a stereo broadcast, protecting the station against unauthorized reception of programs transmitted to subscribers during non-stereo broadcast hours, and preventing objectionable noise which occurs in audio output circuits of multiplex receivers when the subcarrier is removed at the station.

More specifically, according to the invention, at least one of the stereophonically related signals is transmitted over a predetermined frequency range covering a lower portion only of the entire operating range and adding at reception to that signal, signals derived from another channel and covering the rest of the frequency range, thereby providing at the receiver two full frequency channels without full frequency bandwidth at transmission.

Still another object is to provide a stereo broadcast system which will provide two full 50–15,000 cycle high-fidelity channels at FM/AM or FM multiplex stereo receiving points under conditions when the audio response of one of the channels must be restricted because of operational bandwidth limitations of one of the transmission channels or in order to provide optimum signal-to-noise performance under conditions of high-ambient noise which otherwise would preclude satisfactory reception of two high-fidelity channels, each extending to 15,000 cycles.

These and other objects of the invention will be more fully apparent from the drawings annexed herewith, in which FIG. 1 shows, in schematic form, the general eqiupment arrangement of the stereo matrixing and control system embodying the principles of the invention.

Figure 4:
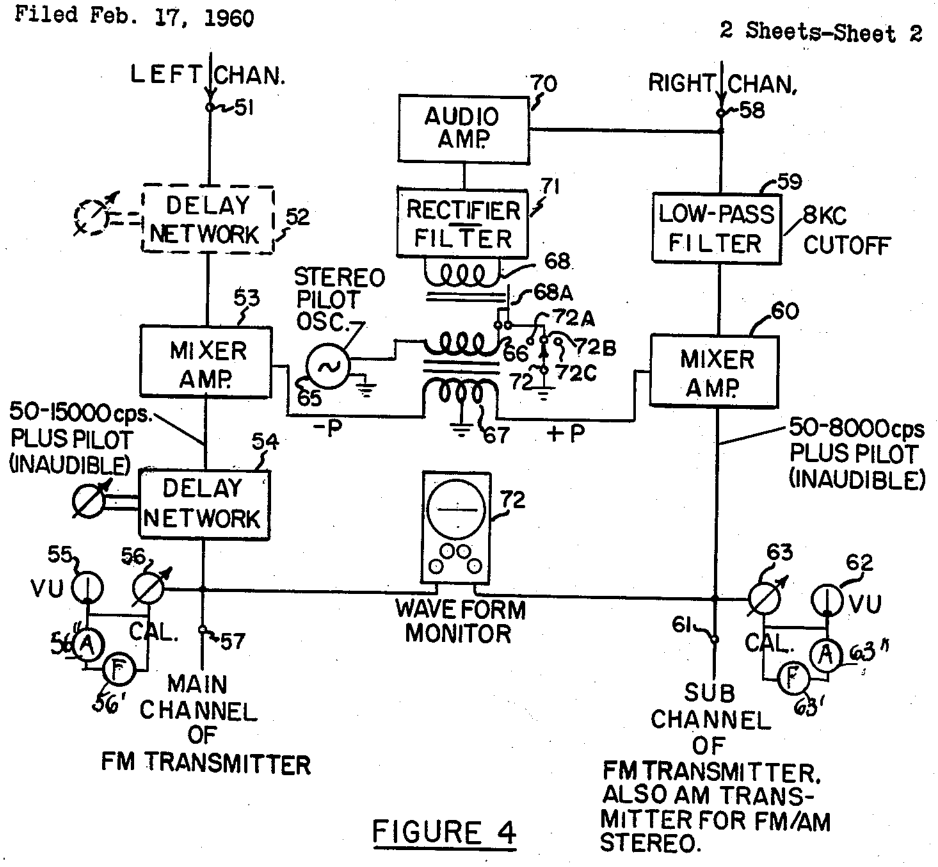
FIGS. 4 and 5 illustrate modifications of a stereo transmitter and receiving circuits, respectively, involving the transmission of a restricted frequency range in one of the channels and the addition at the receiver of the remaining frequencies.

More specifically, the circuit of FIG. 4 also includes a pilot arrangement, under which inaudible pilot signals are applied under balanced conditions to the left and right stereo channels at the transmitter.

A further feature of this circuit is the use of a low-pass filter at the transmitter to restrict the bandwidth of the stereo signals as transmitted by the multiplex channel, or by an AM transmitter in FM–AM or FM–AM–TV stereocast service.

FIG. 4 also illustrates means employed to automatically apply the stereo pilot signal during stereo program transmission, with automatic removal of the pilot signal at the end of a stereo broadcast.

Figure 5:
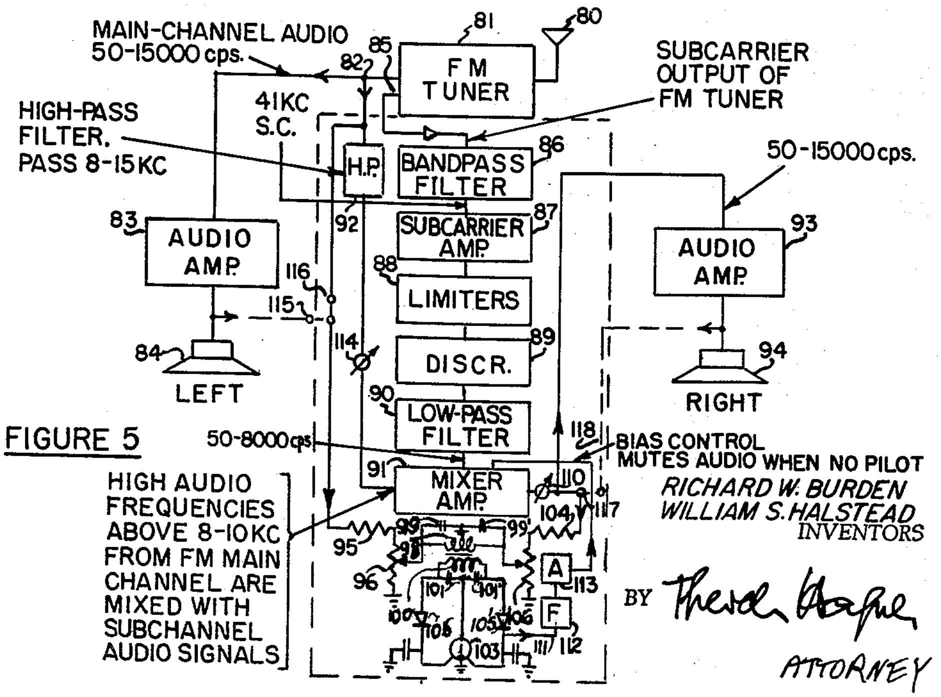

FIG. 5 further illustrates an arrangement of FM tuner and multiplex subcarrier adapter, incorporating visual-indicating means for facilitating establishment of proper stereo balance at receiving points corresponding to the standard reference balance at the transmitter.

FIG. 5 also exemplifies mixing of the high audio frequencies, as derived from the main channel of the high audio frequencies, as derived from the main channel of an FM receiver, with the lower audio frequencies in the output circuit of the multiplex adapter in order to obtain two full 15,000-cycle audio output channels at the stereo receiving point.

FIG. 5 furthermore illustrates means for automatically and selectively silencing the audio output circuit of the multiplex receiver under conditions when no stereo broadcast programs are being transmitted by the broadcast station, as determined by the absence of stereo pilot signal in the receiver.

Figure 1:
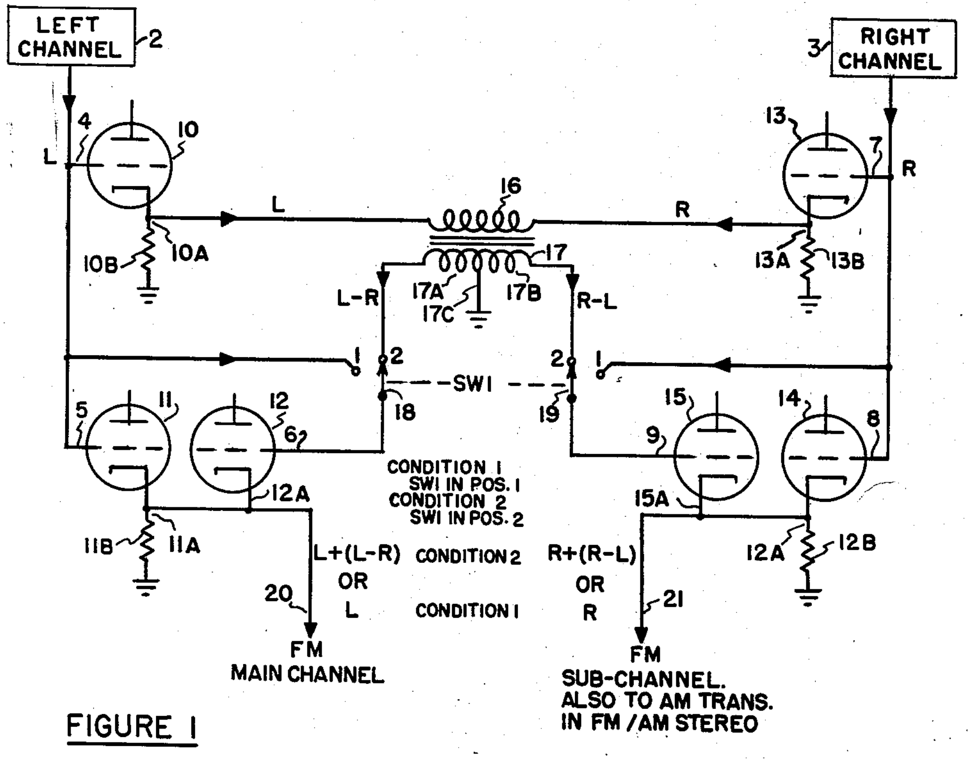

As illustrated in FIG. 1, the matrix at the transmitter operates as follows: "Left" (L) and "right" (R) stereo information is fed from sources 2 and 3, respectively. Each signal (L and R) then is directed along two paths. Signal L is fed to the control grid 4 of cathode follower tube 10, and to control grid 5 of cathode follower 11. Signal R is fed to control grid 7 of cathode follower 13; also to control grid 8 of cathode follower 14. At the cathode output 10A of tube 10, L is fed to one side of the primary 16 of an audio transformer having a center-tap secondary 17. The cathode output of tube 13 is fed to the other side of transformer primary 16. One side 17A of the secondary 17 is connected through switch 18, when in position 2, to control grid 6 of cathode follower 12 whose cathode output circuit 12A is connected in parallel with the cathode output circuit 11A of tube 11, with common cathode resistance 11B to ground as shown. The common cathode output circuit 20 is connected with the audio input circuit of the main channel of an FM broadcast transmitter.

Similarly, signal R is connected on one side to grid 8 of tube 14 and on the other side over grid 7 of tube 13, transformer 16, 17, terminal 2 of switch 19 to grid 9 of tube 15; simultaneously signal 12 is directly applied to terminal 1 of switch 19, while the cathodes of tubes 14, 15 are jointly tied over line 21 either to a subcarrier of an FM transmitter or to another FM or AM transmitter stereophonically related to the main channel fed by line 20.

Differential transformer 16, 17, as shown in FIG. 1, has a split secondary 17A 17B with center tap at ground potential which provides signal components L–R and R–L, equal in amplitude and 180° out of phase with respect to each other.

Amplifier 12 serves to combine the L–R component with the L signal to yield $L+(R-L)$ as the output signal in the left transmission channel 20; the R–L component is combined in amplifier 15 with the R signal to yield R+(R–L) as the output signal in the right transmission channel 21.

This combination occurs in the position 2 shown of switches 18, 19, which may be joined if required into a single switch unit SW1. In the position 1 of switches 18, 19, L and R signals are transmitted substantially unmodified.

Considered as a monophonic signal in either transmission channel, in accordance with the invention and under the worst case of stereophonic separation, the signal in the opposite channel is added at the receiver out of phase and at half-power level (−3 db) as related to the original signal in that channel. Example: $(2L-R)$ and $(2R-L)$.

The differential or difference signals, that is the L–R and R–L signals, correspond to the voltage differential produced by two spaced microphones or other stereo program sources at any instant of time. As these signals are equal in amplitude and 180° out of phase, as explained below, they may be considered as "phantom" signals at stereo listening points since they will cancel acoustically, as apparent from FIG. 2, where a frequency modulation receiver 30 is shown to feed the main channel MC received at 31 over terminal 32, amplifier 35 to left loudspeaker 37; a subchannel is derived at 33 of receiver 30 and applied over multiplex adapter 39, terminal 34, amplifier 36 to right loudspeaker 38.

Figure 2:
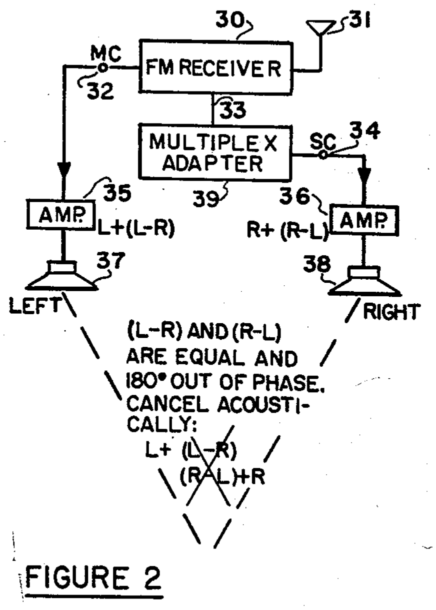
FIG. 2 illustrates, in diagrammatic form, an acoustic matrixing method employed at stereo receiving points in order to obtain separation of L and R stereto channels, without use of an electrical matrix network at the receiver.
Figure 3:
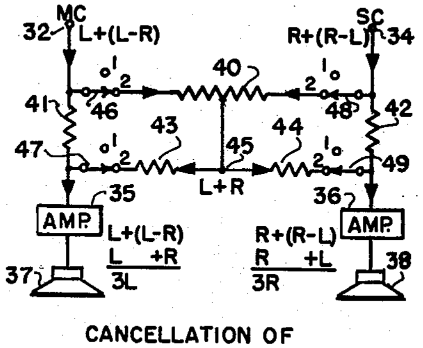
FIG. 3 represents an equivalent electrical matrix, incorporating a relatively simple resistive network arrangement, which provides separation of L and R stereo signals at stereo receiving points.

Electrical cancellation is produced by a physical matrix such as shown in FIG. 3. Here, main and subchannels derived from terminals 32, 34 respectively, such as shown in FIG. 2 are applied over a symmetrical resistor network 40 through 45 and again over amplifiers 35, 36 to left and right loudspeakers 37, 38 respectively, in the position 2 of switches 46 through 49 while in position 1 of switches 46 through 49 the network 40 through 48 is cut off and main and subchannels are directly received, leaving only, as effective signals, the original L and R stereo signals.

As in any matrixing method, proper phase relationships must be preserved throughout the system, although in this method the requirements have been found to be not as exacting as with systems in which L and R signals are combined by matrix summing techniques, requiring full separation of both signals at receiving points.

It is noted that only a relatively small difference voltage is developed in the L–R and R–L branches of the transmission circuit at the lower audio frequencies which carry most of the power and contribute much of the stereo localization effect. Thus, improper phase control, as can occur in transmission circuits such as telephone lines and in the transmitting equipment, may not have as great a detrimental effect as in the case of the matrix arrangements where all of the signal energy in both stereo channels is combined at the transmitter and must be separated out into the proper L and R channels at the receiver. Also, the problem of improperly phased microphones in $L+R$ techniques, where $L+R$ becomes $L-R$ and vice versa and hence produces a serious loss of stereo localization effect at the receiving point, is not a critical matter in accordance with the invention. Another advantage is that, unlike the situation in the summing methods $(L+R)$, the low audio frequencies are not unduly emphasized by addition of signal voltages in two stereo channels, for example, due to two spaced microphones simultaneously receiving the same signal because of the substantial length of sound wavelengths at the low audio frequencies.

As acoustic matrixing principles are utilized at stereo receiving points, no special equipment is required at receivers, thus permitting stations to use the technique in simultaneous FM/AM FM multiplex stereo transmissions. For this reason, also, when well-balanced stereo program material is used at the station, the transmitter matrix may be switched out of the circuit, by use of switch SW1, permitting use of fully separated L and R channels with SW1 in position 1 (condition 1) to provide optimum stereophonic performance, as accomplished by the majority of FM/AM stations and some of the FM stations that have used fully separated L and R channels in developmental FM multiplex stereo broadcasts. Matrix switching circuits are such that the matrix may be inserted or removed from the transmitting circuit without noticeable change in level.

The overall operation of the system is such that two output channels are provided that yield stereophonic sound when used together under normal stereophonic listening conditions at a receiving point, or a signal that provides monophonic reproduction which is indistinguishable from normal monophonic program material when heard separately on either transmission channel, as in normal single-channel radio reception of the main channel of an FM station. L is original left stereo signal as transmitted, R is original right stereo signal as transmitted.

In FIG. 4 the left stereo channel 51 is shown to carry a full frequency range from 50 to 15,000 cycles. The audio signals in this channel are passed through an adjustable delay network 52, if required, and through a mixer amplifier 53 to another adjustable delay network 54. The signal level at the output of network 54 is indicated by means of volume unit meter 55, which is adjusted by calibration member 56 under control of a pilot signal fed over filter 56' and amplifier 56'' to meter 55. Purpose and nature of this pilot signal will be described further below. The signals are then applied at 57 to the main channel of an FM broadcast transmitter.

Similarly, the right stereo signals are fed through right channel 58, a low-pass filter 59 having a cutoff at 8 kc. or at any other predetermined frequency, a mixer amplifier 60 to terminal 61 which is connected with the subchannel of an FM transmitter for multiplex FM stereo transmission, or to an AM transmitter for FM–AM stereo transmission. The signals derived from mixer amplifier 60 are applied to volume unit meter 62 which is also adjusted or calibrated by means of control member 63 and through a filter 63' and amplifier 63''.

A stereo pilot signal of inaudible type, for example at a subsonic frequency of 20 cycles, is derived from oscillator 65, and applied over primary winding 66 of a transformer to mixer amplifiers 53 and 60, respectively. Transformer secondary 67 is grounded at its center tap so that the voltages of the pilot signal applied to amplifiers 53, 60, respectively, while equal in amplitude are 180° out of phase with respect to each other.

These pilot signals are applied to the main channel of the FM transmitter, and to the subchannel (or an AM transmitter) at a low modulation level such as 1% or 2%. The pilot signal from source 65 is applied to primary 66 under control of relay 68, 68A and only when relay coil 68 is energized with contact closed at 68A as shown. Energizing of relay coil 68 is caused by an envelope or median value of audio signals derived from channel 58 through amplifier 70 and rectifier and filter unit 71.

Thus, only in case a station is broadcasting a stereophonic program, the audio signals in the right stereo channel will cause relay coil 68 to be energized and the pilot signal to be applied to mixer amplifiers 53 and 60 to be transmitted. The signals thus transmitted in the left stereo channel, therefore, will include the normal program signals in the audio frequency range, 50 to 15,000 cycles, plus the subsonic pilot signal having a frequency of 20 cycles. The right stereo channel will carry the audio program signals in a range of, say, 50 to 8,000 cycles plus the pilot signal of 20 cycles. This latter pilot signal will be 180° out of phase and equal in amplitude with respect to the pilot signal in the left stereo channel.

In accordance with the invention, the pilot signal may be used for two functions:

(1) To mute the audio output circuit of the multiplex subchannel automatically upon termination of a stereo broadcast and during pauses in program, thereby precluding reception of subscription programs directed to subscribers by the station during hours when the station is not engaged in stereophonic broadcast service;

(2) To permit a listener to quickly adjust his equipment for proper stereo balance by means of a balanced reference signal transmitted under closely controlled conditions at the transmitting station as will be explained further below.

In order to facilitate the proper adjustment at the transmitter station and to maintain optimum stereo balance in the transmitted signal, the pilot signal appearing in both the left and right channels can be observed visually by means of an oscilloscope 72. This also permits proper adjustment of level of the pilot signal in each of the two channels. At the same time, it permits the station operator to observe the program signals on the two stereo channels.

At the receiver, as apparent from FIG. 5, the radio signals as received from the broadcast station are picked up by antenna 80 and an FM tuner 81. The main channel audio signals derived at output terminal 82 are applied over amplifier 83 to the left loudspeaker 84. The subcarrier output derived at terminal 85 of tuner 81 are applied to the input of a band pass filter 86 designed to pass, in this illustrative example, a frequency modulated subcarrier having a center frequency of, say 41 kc.

Filter 86 removes the audio frequency signals in the band of 50–15,000 cycles, and also prevents reception of other subcarriers which may be transmitted simultaneously by the broadcast station. The subcarrier is then passed over amplifier 70, limiter 88 to discriminator 89 having in its audio output a low pass filter 90. Low pass filter 90, for example, has a cut off at approximately 8 kilocycles. The filtered audio signal is then applied to one input of mixer amplifier 91 whose second input receives audio frequency in the range of 8 to 15,000 cycles derived from high pass filter 92 which, in turn, is connected to main channel terminal 82 of tuner 81. The common audio output of mixer amplifier 91 is fed over audio amplifier 93 to loudspeaker 94 which now reproduces the full audio range extending from 50 to 15,000 cycles.

Main channel terminal 82 is further connected either directly from terminal 116 or, as schematically indicated by dotted line, after amplification from terminal 115, over isolation resistor 95 to a potentiometer 96 having a slider connected to one side of transformer primary 98. Condensers 99 and 99' are connected across primary 98 in such a manner as to bypass audio frequency signals and to facilitate passage of the 20 cycle pilot signal. The secondary 100 of this transformer is tuned to 20 cycles by means of condensers 101 and 101' and connected from the ends of winding 100 to a grounded center tap. A stereo balance meter, schematically indicated at 103, is connected through rectifiers 105, 105' across secondary 100 to provide visual indication of proper stereo balance as determined by the pilot signal.

In order to provide a balance with respect to the 20 cycle pilot signal in the subchannel, or right channel, the audio output of mixer amplifier 91 is also connected over an isolation resister 104 to a potentiometer 106 having a slider connected to the other side of transformer primary 98.

On the assumption that the pilot signals have been properly balanced at the transmitter, in the left and right channels, the two pilots signals will appear in secondary winding 100 in such a manner that they cancel each other out. Therefore, no voltage will be produced and the needle of indicator 103 will not move. However, if there is an unbalance in the two channels, the needle will move in one direction or the other thereby permitting the listener to adjust the relative amplitude of the two channels by means of the usual level control 110.

Rectified output is also applied at 111 over filter 112 to D.C. amplifier 113 to provide a bias voltage for a control electrode of mixer amplifier 91 so as to mute the audio when the pilot signal is not present.

In this manner, when the pilot signal is not transmitted by the broadcast station, as is the case during hours when there are no stereophonic programs, the audio output circuit of the subchannel receiver is silenced automatically, thereby preventing the objectionable rush of noise which might be present if the subcarrier is removed as is often the case during transmission of special programs to subscribers, not intended to be received by the public.

The invention is not limited to the specific circuits, circuit elements and circuit connections shown and described nor to the specific operating ranges exemplified, but may be applied in any form or manner whatsoever without departing from the scope of this disclosure.

We claim:

1. In a stereophonic transmission system, means for producing one stereo signal on a frequency modulated main carrier, means for producing another stereo signal on a frequency modulated subcarrier, means including a differential amplifier for deriving from said stereo signals a pair of difference signals, and means for combining each of said difference signals with said original stereo signals.

2. System according to claim 1 comprising switching means for selectively preventing said difference signals from being combined with said original signals.

3. System according to claim 1 comprising a first pair of amplifiers having inputs and outputs, the inputs being coupled respectively to said stereo signal producing means; and a second pair of amplifiers having inputs and outputs, the outputs of said two pairs of amplifiers being coupled to each other second, and multiposition switching means, said differential amplifier having inputs coupled to said stereo signal producing means and outputs coupled to said switching means; and said second pair of amplifiers having inputs coupled to said switching means; said switching means including means for connecting in one position of said switching means said differential amplifier outputs to inputs of said second pair of amplifiers while disconnecting the inputs of said first pair of amplifiers from the inputs of said second pair of amplifiers, and means for connecting in another position of said switching means the inputs of said first pair of amplifiers to the inputs of said second pair of amplifiers while disconnecting the outputs of said differential amplifier from the inputs of said second pair of amplifiers.

4. System according to claim 2 wherein said differential amplifier includes separate amplifiers having inputs and outputs, the inputs being connected to said stereo signal producing means; and a differential transformer having a primary connected to outputs of said separate amplifiers and a secondary having a center tap connected to a predetermined potential and outer ends connected to said switching means.

5. System according to claim 4 wherein said separate amplifiers are cathode follower tubes.

6. System according to claim 1 wherein said combining means include pairs of cathode follower tubes having cathodes connected in common to input electrodes coupled to said stereo signal producing means and differential amplifier, respectively.

7. In a stereophonic transmission and reception system, means at transmission for producing one stereo signal on a frequency modulated main carrier, means for producing another stereo signal on a frequency modulated subcarrier, means including a differential amplifier for deriving from said stereo signals a pair of difference signals, and means for combining each of said difference signals with said original stereo signals; and means at reception for receiving, separating, and reproducing said difference signal including means for cancelling out the negative portions of said difference signals.

8. System according to claim 7 wherein said reproduction means include means for cancelling out acoustically the negative portions of said difference signals.

9. System according to claim 7 wherein said reproduction means include for cancelling out electrically the negative portions of said difference signals.

References Cited in the file of this patent

UNITED STATES PATENTS

| | | |
|---|---|---|
| 2,093,540 | Blumlein | Sept. 21, 1937 |
| 2,098,561 | Beers | Nov. 9, 1937 |
| 2,352,696 | DeBoer | July 4, 1944 |
| 2,611,036 | Norgaard | Sept. 16, 1952 |
| 2,698,379 | Boelens | Dec. 28, 1954 |
| 2,851,532 | Crosby | Sept. 9, 1958 |
| 2,874,221 | Dauguet | Feb. 14, 1959 |

FOREIGN PATENTS

| | | |
|---|---|---|
| 528,061 | Great Britain | Oct. 22, 1940 |

OTHER REFERENCES

"Three-Channel FM Stereo System," RCA Technical Notes Number 345, dated November 1959.